(12) United States Patent
Seki

(10) Patent No.: US 9,423,574 B2
(45) Date of Patent: Aug. 23, 2016

(54) EXTRACTION MECHANISM AND DEVICE

(71) Applicant: HONDA TSUSHIN KOGYO CO., LTD., Tokyo (JP)

(72) Inventor: Shinji Seki, Tokyo (JP)

(73) Assignee: HONDA TSUSHIN KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/751,966

(22) Filed: Jun. 26, 2015

(65) Prior Publication Data
US 2016/0062057 A1 Mar. 3, 2016

(30) Foreign Application Priority Data
Aug. 28, 2014 (JP) ................. 2014-173804

(51) Int. Cl.
*G02B 6/38* (2006.01)
*G02B 6/42* (2006.01)

(52) U.S. Cl.
CPC ............ *G02B 6/3893* (2013.01); *G02B 6/3898* (2013.01); *G02B 6/4261* (2013.01); *G02B 6/4292* (2013.01)

(58) Field of Classification Search
CPC .. G02B 6/3893; G02B 6/3898; G02B 6/4261; G02B 6/4292
See application file for complete search history.

(56) References Cited

U.S. PATENT DOCUMENTS

| 7,325,975 B2 * | 2/2008 | Yamada | G02B 6/4292 385/54 |
| 7,517,160 B2 * | 4/2009 | Miyoshi | G02B 6/4201 385/53 |
| 2003/0161108 A1 | 8/2003 | Bright et al. | |
| 2003/0198025 A1 | 10/2003 | Cao | |
| 2004/0228582 A1 * | 11/2004 | Yamada | G02B 6/4292 385/81 |
| 2006/0146506 A1 | 7/2006 | Wu et al. | |
| 2008/0232758 A1 * | 9/2008 | Miyoshi | G02B 6/4201 385/136 |

FOREIGN PATENT DOCUMENTS

| JP | 2004-343506 | | 12/2004 |
| JP | 2004343506 A | * | 12/2004 |
| JP | 2005189684 A | * | 7/2005 |
| JP | 2006-269442 | | 10/2006 |
| JP | 2006269442 A | * | 10/2006 |
| JP | 2006-337727 | | 12/2006 |
| JP | 2006337727 A | * | 12/2006 |

(Continued)

OTHER PUBLICATIONS

Notification of Reasons for Refusal dispatched Oct. 27, 2015 in corresponding Japanese Patent Application No. 2014-173804 with English translation.

(Continued)

*Primary Examiner* — Peter Radkowski
(74) *Attorney, Agent, or Firm* — Wenderoth, Lind & Ponack, L.L.P.

(57) ABSTRACT

An extraction mechanism A has: a release part, e.g., a slider 6, configured to release an engagement between a cage 2 and a device, e.g., an optical module 1, inserted into the cage 2 and engaged and latched to the cage 2; an ejection part, e.g., an ejector 5, etc., configured to eject the device out of the cage 2; and a release lever 7 configured to activate the release part and the ejection part. The extraction mechanism is provided to the device. This enables to clearly inform an operator of the extraction operation.

8 Claims, 8 Drawing Sheets

(56) References Cited

FOREIGN PATENT DOCUMENTS

| | | | |
|---|---|---|---|
| JP | 2008-233645 | | 10/2008 |
| JP | 2008233645 A | * | 10/2008 |
| JP | 2014-154224 | | 8/2014 |

OTHER PUBLICATIONS

Extended European Search Report issued Feb. 5, 2016 in corresponding European Patent Application No. 15175044.5.

* cited by examiner

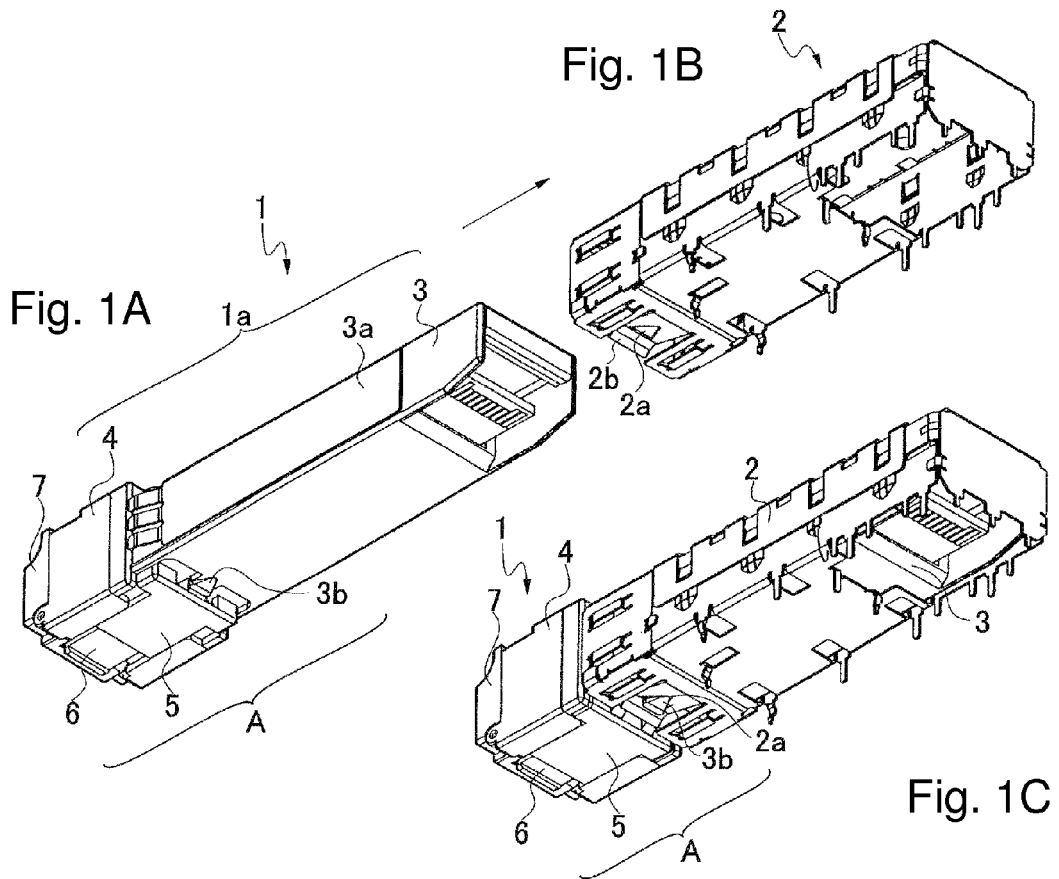
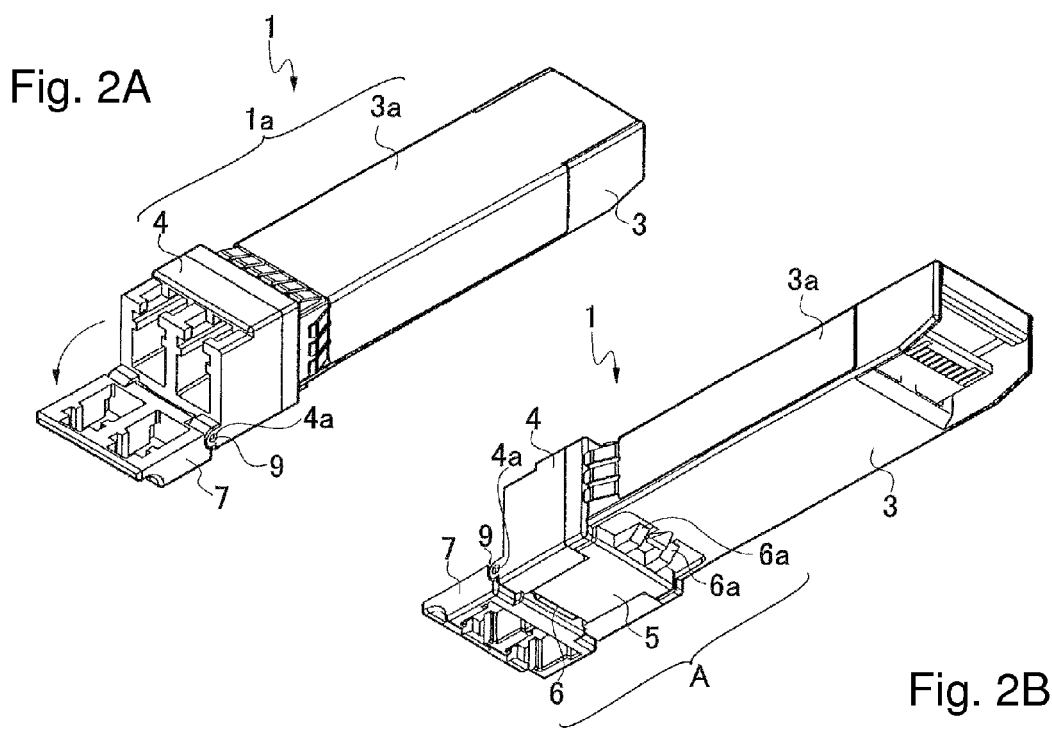

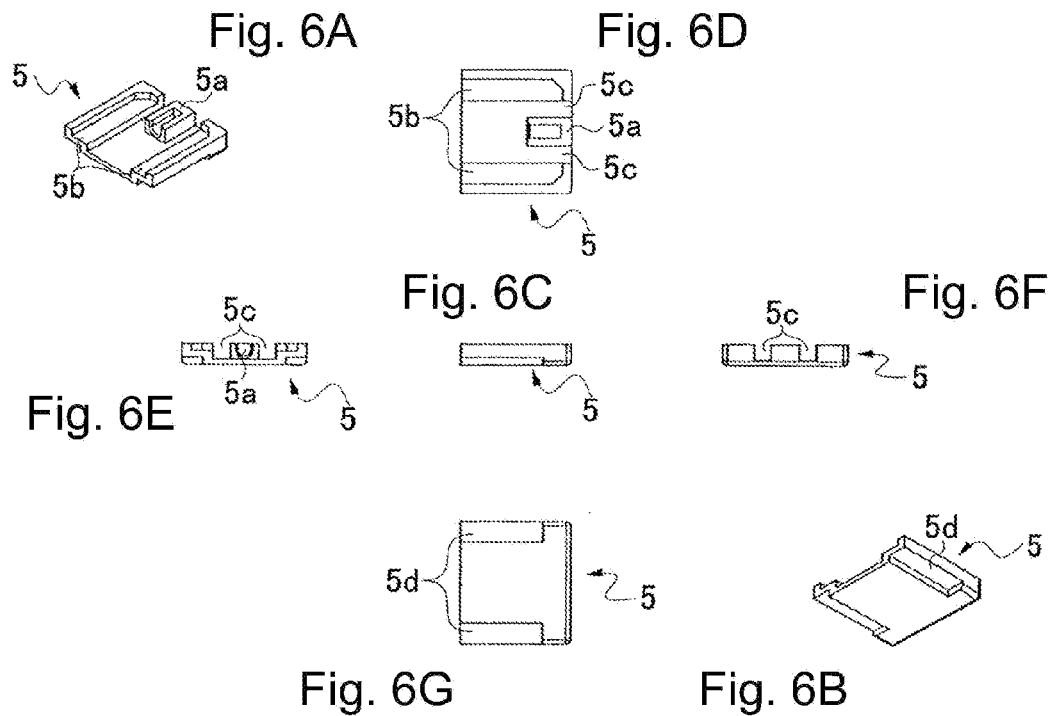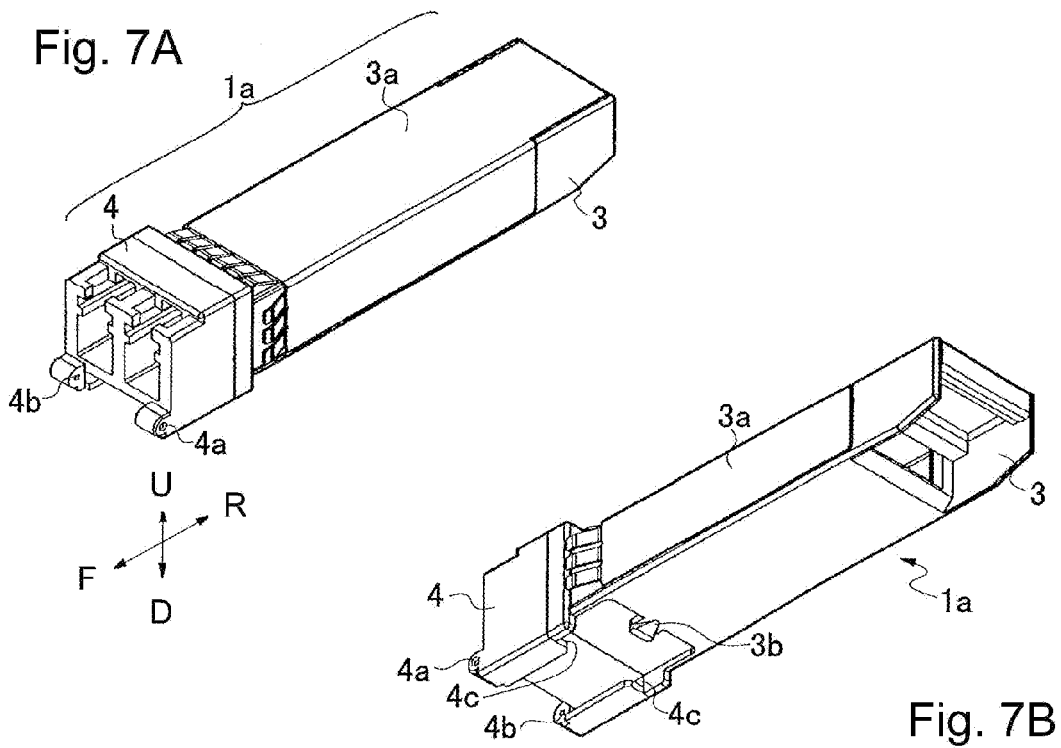

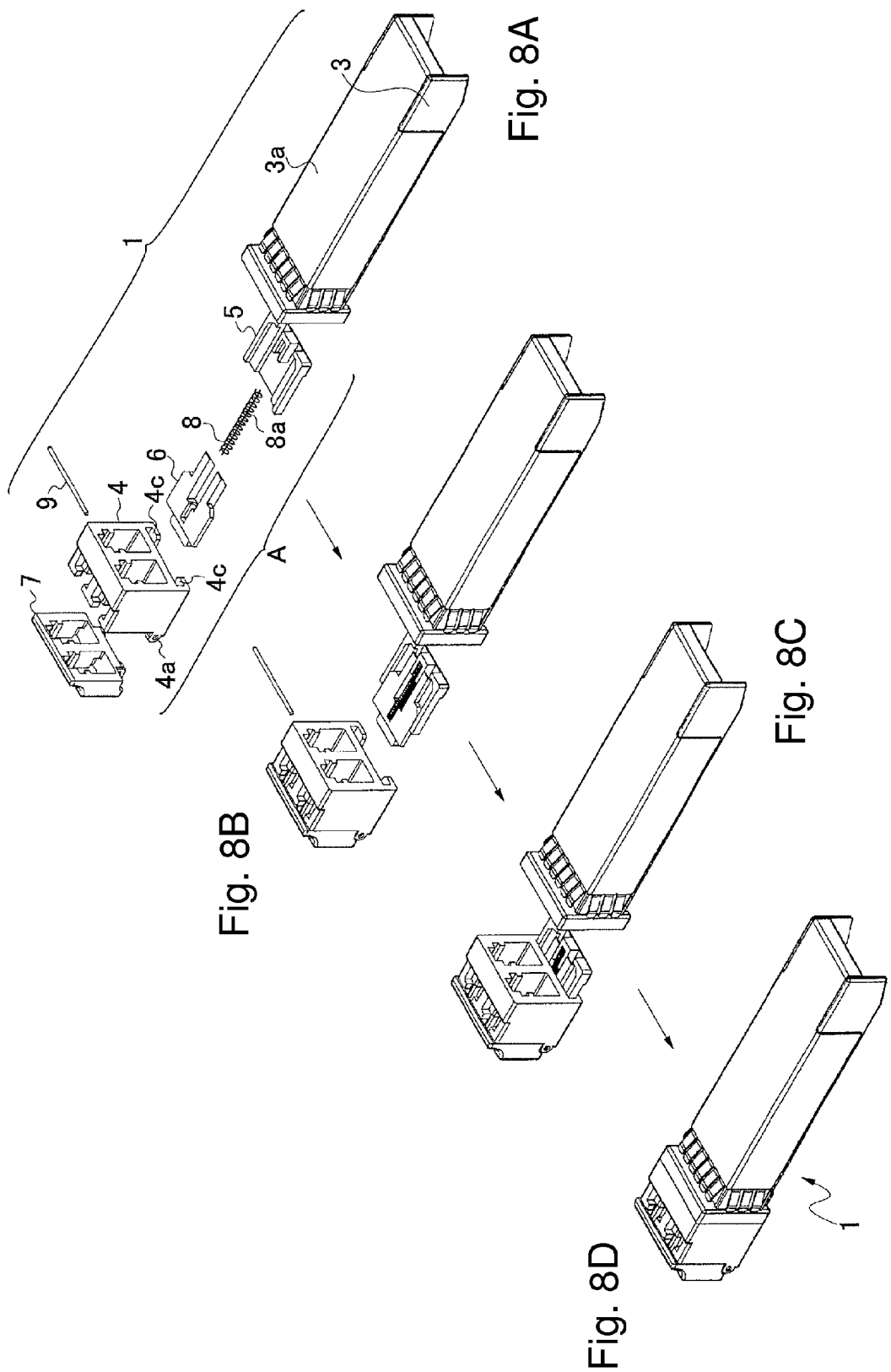

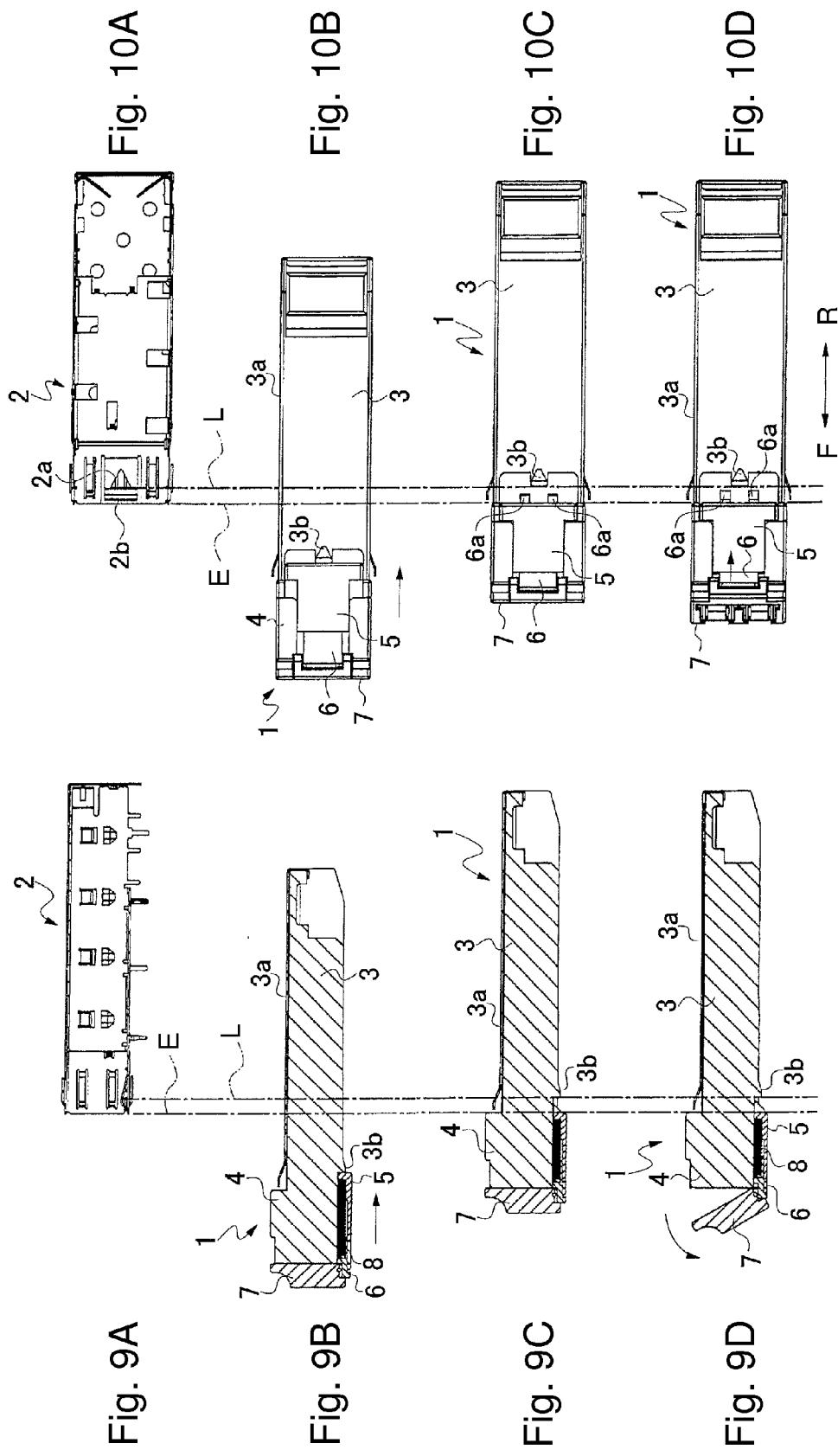

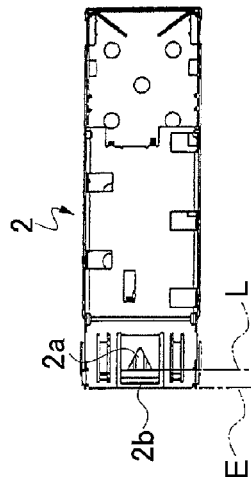
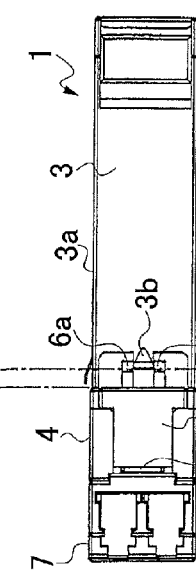
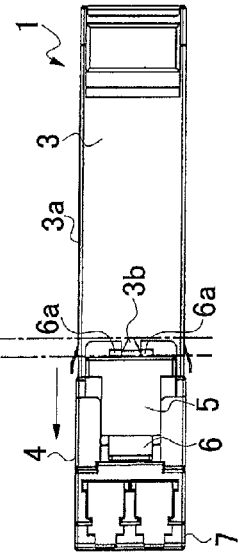
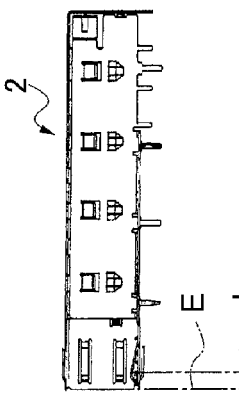
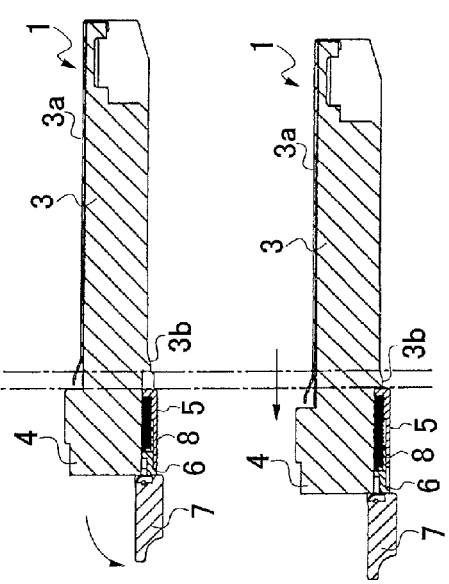

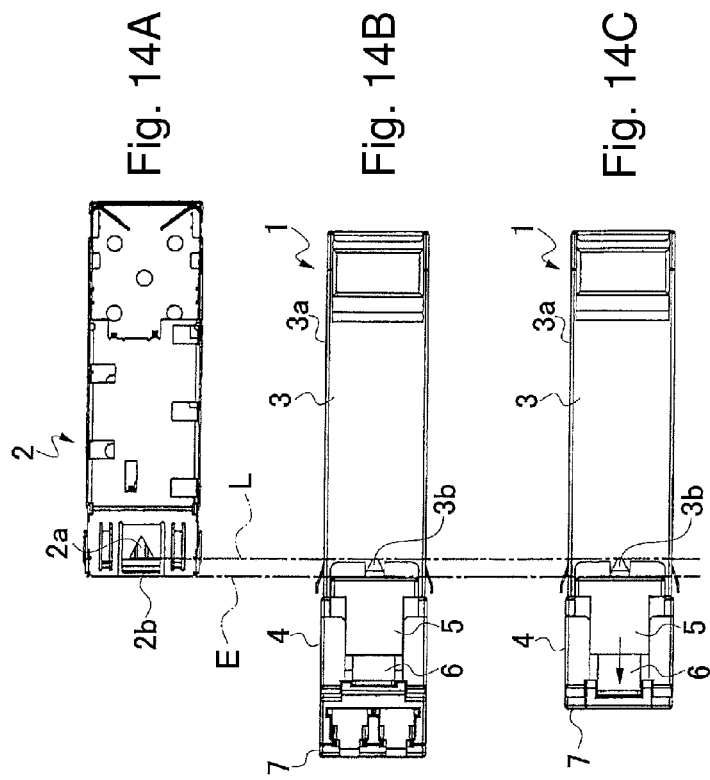
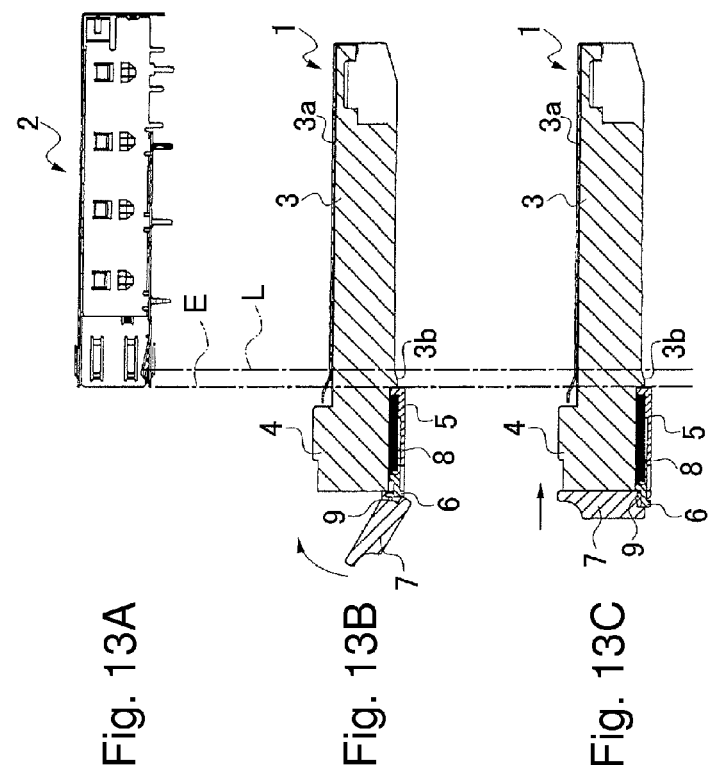

EXTRACTION MECHANISM AND DEVICE

TECHNICAL FIELD

The present disclosure is related to an extraction mechanism for extracting a device, such as an optical module, latched to a cage from the cage, and a device having the extraction mechanism.

BACKGROUND

A device, such as an optical module, e.g., a communication transceiver used for connecting an optical fiber to a communication equipment, etc., is inserted into a cage fixed to a circuit board, etc., of the communication equipment, and engaged and latched to the cage. The device has a release mechanism for releasing the engagement between the device and the cage.

The release mechanisms are, for example, disclosed in JP 2006-337727 A, JP 2006-269442 A, and JP 2004-343506 A.

SUMMARY

Problem to be Solved

Extracting the device from the cage requires a manipulation of the release mechanism to release the engagement between the device and the cage, and then another manipulation to pull the device out of the cage. To aid the pulling manipulation, it is considered to provide the cage with a kickback mechanism to push the device out. However, variation of weights, etc., of the devices to be connected to the cage make it difficult to appropriately adjust the pushing force. Moreover, since the kickback mechanism operates when the lock is released by manipulating the release mechanism, the manipulation of the release mechanism may interfere with the operation of the kickback mechanism and make it insufficient. the insufficient push of the kickback mechanism makes it difficult to determine whether disconnection is done. Especially, in the case that plural devices are crowded, such that a large number of optical modules are connected to one communication equipment in grid shape, working spaces are narrow and hard to see. This results in difficulty of confirmation of disconnection between the device and the cage, and decrement of efficiency of exchange operations of optical modules. The present disclosure aims to solve the above problems.

Means to Solve the Problem

An extraction mechanism according to the present disclosure has a release part configured to release an engagement between a cage and a device inserted into the cage and engaged and latched to the cage; an ejection part configured to eject the device out of the cage; and a release lever configured to activate the release part and the ejection part. The extraction mechanism is provided to the device.

The release lever is preferable to be configured to be pushed to a release direction to activate the release part and the ejection part. The release direction is preferable to be different from an insertion direction and an extraction direction of the device.

The extraction mechanism is preferable to have a slider slidable to an insertion direction and an extraction direction of the device; an ejector slidable to the insertion direction and the extraction direction; and an energization member located between the slider and the ejector, and configured to energize the slider to the extraction direction and to energize the ejector to the insertion direction. The ejector is preferable to be configured to contact with the cage and to catch an energization force of the energization member when the device is latched to the cage. By the release lever pushed to a release direction, the slider is preferable to be configured to slide to the insertion direction, thereby compressing the energization member to charge energy in the energization member, and releasing the engagement between the cage and the device.

And by release of the engagement between the cage and the device, the energy charged in the energization member is preferable to be configured to be released to push the slider to the extraction direction, thereby ejecting the device out of the cage.

By the energization member pushing the release lever via the slider to a direction opposite to the release direction, the release lever is preferable to be configured to return to an original position.

a collision sound is preferable to be configured to occur by the ejector hitting a part of the device, when the device is ejected out of the cage.

The release lever is preferable to be swingable around a swinging axis substantially perpendicular to an insertion direction and an extraction direction of the device. And the release part and the ejection part are preferable to be configured to be activated when the release lever reaches a position in the extraction direction looking from the swing axis.

The device is preferable to have a connector configured to be connected with a connector plug. And the release lever is preferable to have an opening configured to be inserted an end of the connector plug through.

A device according to the present disclosure has the extraction mechanism.

The device is preferable to be an optical module.

Advantageous Effect

The extraction mechanism and the device according to the present disclosure enable to clearly inform an operator of extraction of the device, such as the optical module, because the device is popped out of the cage by only manipulating the release lever to activate the release part and the ejection part.

The extraction operation can be done by one action. This enhances the operational efficiency. The extraction mechanism is provided to the device. This makes it easy to design an amount of popping-out to be appropriate with conforming to weights, etc., of the device.

The direction to manipulate the release lever being different from the insertion direction and the extraction direction prevents the manipulation of the release lever from interfering the operation of the ejection part.

Charging energy in the energization member by the slider sliding to the insertion direction enables to pop the device out with appropriate force when the engagement between the device and the cage is released.

The energization member pushing the release lever to return to the original position reduces a cost and the number of components, because another energization member is not needed for return.

The collision sound occurring by the ejector hitting the part of the device makes extraction of the device to be confirmed by auditory sense.

Activating the release part and the ejection part at the time of the release lever reaching the position in the extraction direction looking from the swinging axis makes ejection force of the ejection part to efficiently transmit to the device, thereby popping out the device.

Providing the release lever with the opening configured to be inserted the end of the connector plug through shortens the length of the whole of the device, thereby saving a space. Furthermore, misoperation is prevented because the release lever can not be manipulated when the connector plug is connected.

BRIEF DESCRIPTION OF THE DRAWINGS

FIG. 1A shows a perspective view of an optical module 1 viewed from below.

FIG. 1B shows a perspective view of a cage 2 viewed from below.

FIG. 1C shows a perspective view of the optical module 1 and the cage 2 fitting together viewed from below.

FIGS. 2A and 2B show perspective views of the optical module 1 with an opened release lever 7 viewed from above and below, respectively.

FIGS. 6A to 6G show perspective views viewed from above and below, a right side view, a plan view, a front view, a rear view, and a bottom view of the ejector 5, respectively.

FIGS. 7A and 7B show perspective views of the optical module 1 without an extraction mechanism A viewed from above and below, respectively.

FIGS. 8A to 8D are perspective views showing assembly sequences of the optical module 1.

FIG. 9A is a sectional side view showing a position of the cage 2, which is omitted in FIGS. 9B to 9D.

FIG. 10A is a bottom view showing a position of the cage 2, which is omitted in FIGS. 10B to 10D.

FIG. 11A is a sectional side view showing a position of the cage 2, which is omitted in FIGS. 11B and 11C.

FIG. 12A is a bottom view showing a position of the cage 2, which is omitted in FIGS. 12B and 12C.

FIG. 13A is a sectional side view showing a position of the cage 2, which is omitted in FIGS. 13B and 13C.

FIG. 14A is a bottom view showing a position of the cage 2, which is omitted in FIGS. 14B and 14C.

FIGS. 9B and 9C are sectional side views showing sequences to insert the optical module 1 into the cage 2.

FIGS. 10B and 10C are bottom views showing sequences to insert the optical module 1 into the cage 2.

FIGS. 9D, 11B, 11C, 13B and 13C are sectional side views showing sequences to extract the optical module 1 out of the cage 2.

FIGS. 10D, 12B, 12C, 14B and 14C are bottom views showing sequences to extract the optical module 1 out of the cage 2.

DETAILED DESCRIPTION

Figure 3A:
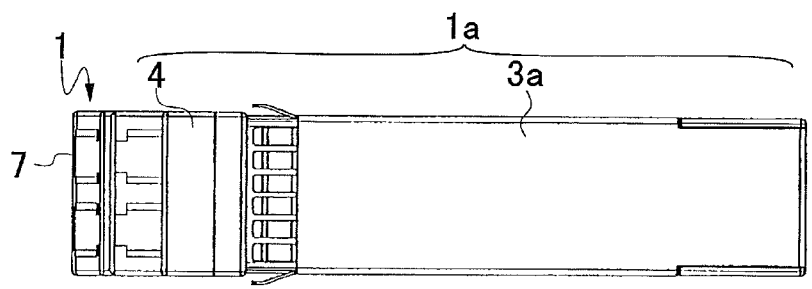
FIGS. 3A to 3F show a plan view, a right side view, a bottom view, a left side view, a front view and a rear view of the optical module 1, respectively.
Figure 3B:
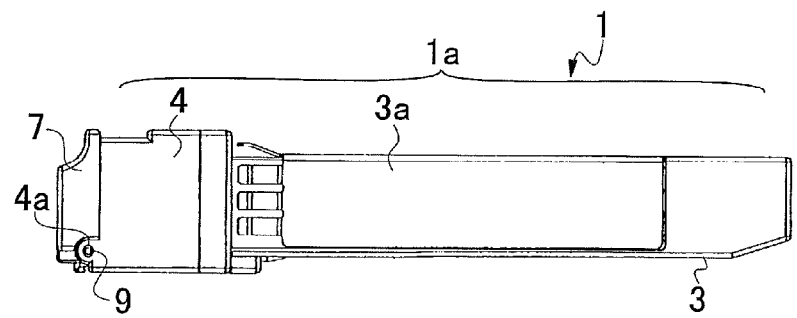
Figure 3C:
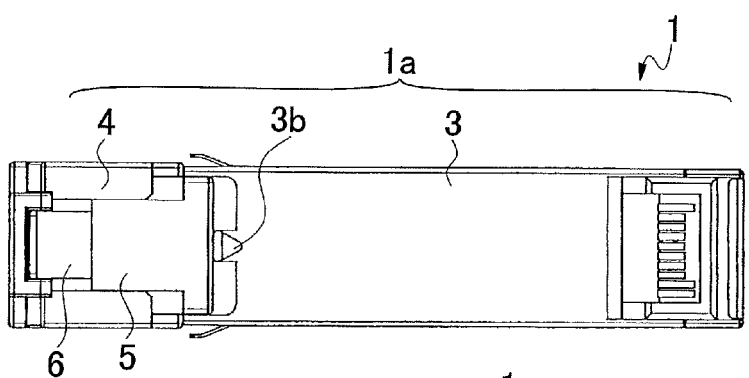
Figure 3D:
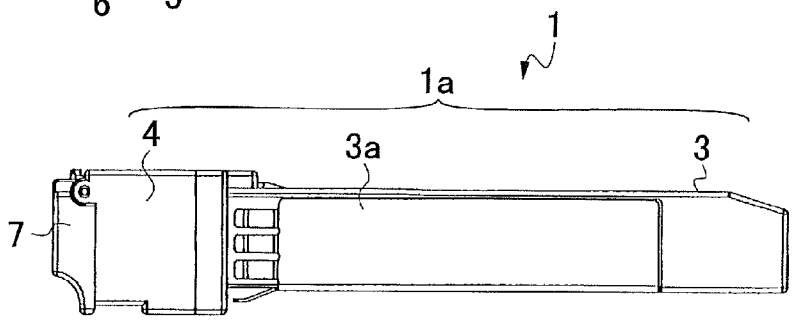
Figure 3E:
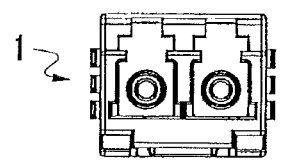
Figure 3F:
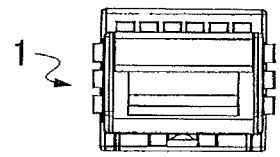

As shown in FIG. 1A, an optical module 1, an example of a device, has a connector 1a and an extraction mechanism A. A cage 2 shown in FIG. 1B is fixed to a communication equipment, etc. As shown in FIG. 1C, the optical module 1 is inserted into and latched to the cage 2. The optical module 1 is configured to popping out of the cage 2 when extracted from the cage 2. This makes the extraction to be clearly recognized.

The cage 2 has, for example, a tubular shape. The cage 2 is fixed to a circuit board, etc., of a communication equipment to be connected to the optical module 1. The cage 2 acts as a shield. The cage 2 has an opening at a longitudinal end. Through the opening, the optical module 1 is inserted into the cage 2. Not only to the optical module, the extraction mechanism A can be applied to an electric connection equipment, an electric communication equipment, etc.

As shown in FIG. 1A, the optical module 1 substantially has a slender cuboid shape. The connector 1a has, for example, a base 3, a main cover 3a, an optical communication member (omitted) provided in the base 3 and the main cover 3a, and a housing 4 located at a front side of the optical module 1. The extraction mechanism A is equipped to the housing 4. The extraction mechanism A has an ejector 5, a slider 6, a release lever 7, an energization member 8 (see FIG. 8A), a buckling prevention pin 8a (see FIG. 8A), and a fixation pin 9 (see FIG. 8A). The base 3 is, for example, made of zinc by die-casting. The main cover 3a is, for example, made of metal. The main cover 3a shields upper, left and right sides of the optical module 1. The optical communication member includes, for example, an optical communication equipment, such as a transceiver, a circuit board, etc. The housing 4 and the ejector 5 are, for example, made of plastic. The energization member 8 and the buckling prevention pin 8a are, for example, made of metal.

The base 3 has a latching protrusion 3b near a front side on a bottom surface. The cage 2 has, as shown in FIG. 1B, a latching plate 2b. The latching plate 2b is, for example, a flat spring. The latching plate 2b is provided with a latching hole 2a. When the optical module 1 is inserted into the cage 2, as shown in FIG. 1C, the latching protrusion 3b falls into the latching hole 2a, thereby latched to it.

The housing 4 is a frame for connecting an optical fiber. The housing 4 is, for example, an LC duplex adaptor, and has two connection openings to be inserted LC plugs into. The LC plug is provided at an end of the optical fiber. A slit sleeve, a ferrule, etc. are provided inside the connection opening. The housing 4 is not limited to an LC adaptor. It may be an SC adaptor, or another type adaptor. Also, the housing 4 is not limited to a duplex adaptor. It may be a simplex adaptor.

The slider 6 is a release part configured to release an engagement between the latching protrusion 3b of the base 3 and the latching hole 2a of the cage 2. The release lever 7 is a manipulation part configured to slide the slider 6.

Figure 5A:
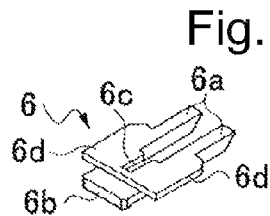
FIGS. 5A to 5G show perspective views viewed from above and below, a right side view, a plan view, a front view, a rear view, and a bottom view of the slider 6, respectively.
Figure 5D:
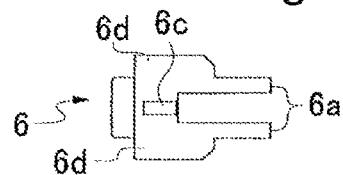
Figure 5E:
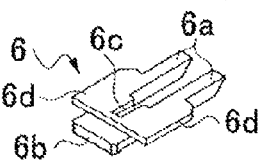
Figure 5C:
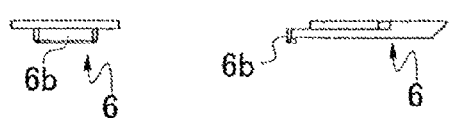
Figure 5F:
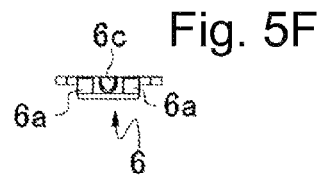
Figure 5G:
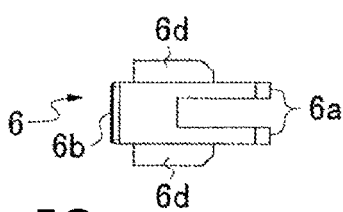
Figure 5B:
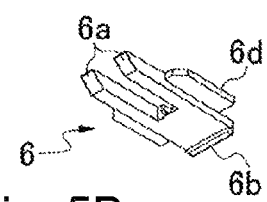

The slider 6 has, as shown in FIGS. 5A to 5G, two protruded release arms 6a, a contact plate 6b configured to contact with the release lever 7, a spring seat 6c configured to receive an end of the energization member 8, and guiding plates 6d configured to slide with the ejector 5. The slider 6 is, for example, made of plastic. The release arm 6a has a taper end, which pushes down the latching plate 2b of the cage 2, thereby releasing the engagement between the latching protrusion 3b and the latching hole 2a.

Figure 4A:
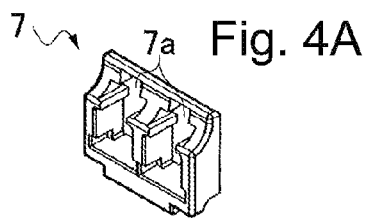
FIGS. 4A to 4G show perspective views viewed from above and below, a right side view, a plan view, a front view, a rear view, and a bottom view of the release lever 7, respectively.
Figure 4D:
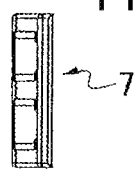
Figure 4E:
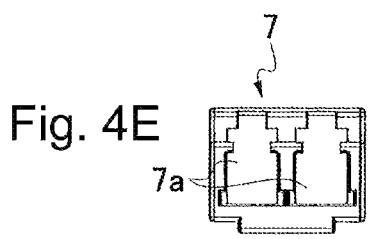
Figure 4C:
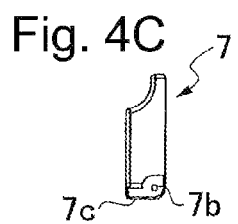
Figure 4F:
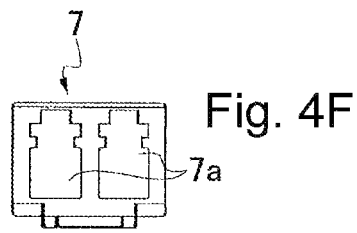
Figure 4G:
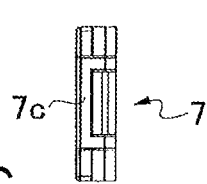
Figure 4B:
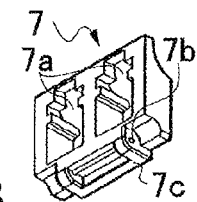

The release lever 7 has, as shown in FIGS. 4A to 4G, two openings 7a, shaft holes 7b configured to be inserted the fixation pin 9 through, and a swinging wall 7c configured to contact with the contact plate 6b of the slider 6. The housing 4 has, as shown in FIGS. 7A and 7B, two shaft holes 4a and 4b. The fixation pin 9 is pressed into the shaft holes 4a and 4b, thereby fixed to it. The release lever 7 is, as shown in FIGS. 2A and 2B, swingable by 90 degrees around the fixation pin 9 as a swinging axis. The swingable range of the release lever 7 is not limited to 90 degrees. It may be any other degrees, such as 180 degrees. When the release lever 7 is closed, the release lever 7 is linked to the connection openings of the housing 4, and the release lever 7 and the housing 4 are conjunct and constitute a predetermined adaptor shape on the whole, which is connected with the plug provided at the end of the optical fiber.

The ejector 5, the energization member 8, and the buckling prevention pin 8a constitute an ejection part configured to eject the optical module 1 out of the cage 2 when the slider 6 releases the engagement between the latching protrusion 3b and the latching hole 2a. The ejection part is located on a bottom side of the housing 4.

The ejector 5 has, as shown in FIGS. 6A to 6G, a spring seat 5a configured to receive an end of the energization member 8, guiding grooves 5b configured to contact the guiding plate 6d of the slider 6 to guide the slider 6, two protrusion guiding grooves 5c, and guiding plates 5d configured to slide with the housing 4. The slider 6, guided by the guiding grooves 5b, is movable to F/R directions (see FIG. 10D) relative to the ejector 5. When the slider 6 moves to the R direction relative to the ejector 5, the release arms 6a of the slider 6 protrudes through the protrusion guiding grooves 5c out of the ejector 5. The housing 4 has, as shown in FIG. 7B, guiding grooves 4c. The guiding grooves 4c contact with the guiding plates 5d to guide the ejector 5. The ejector 5, guided by the guiding grooves 4c, is movable to the F/R directions relative to the housing 4.

The energization member 8 is, for example, a coil spring. As shown in FIG. 8B, the energization member 8 has a first end configured to contact with the spring seat 6c of the slider 6, and a second end configured to contact with the spring seat 5a of the ejector 5, thereby energizing the slider 6 and the ejector 5 to opposite directions so that they are apart from each other. The buckling prevention pin 8a is located through the energization member 8 to prevent the energization member 8 from bending. By energizing the slider 6, the energization member 8 pushes the swinging wall 7c of the release lever 7. This results in ejection of the optical module 1 out of the cage 2, and also rotation of the release lever 7 around the fixation pin 9 to make the release lever 7 to return to the original closing position.

The optical module 1 is required to have a size within a predetermined one defined by a standard. The ejection part is configured that the total size combined with the connector 1a is accommodated to the predetermined size defined by the standard. Thus, the optical module 1 can be inserted into any cage designed according to the standard, with no alteration of the cage.

Next, motions of the extraction mechanism will be described in the case that the optical module 1 is inserted into the cage 2.

As shown in FIGS. 9B and 10B, the optical module 1 is inserted from an F direction into the cage 2 located at a position shown in FIGS. 9A and 10A. The slider 6 is energized to the F direction, i.e. an extraction direction, relative to the ejector 5 by the energization member 8, thereby located at a position where the contact plate 6b contacts with the swinging wall 7c of the release lever 7. The ejector 5 is energized to an R direction, i.e. an insertion direction, relative to the slider 6 by the energization member 8, thereby located at a position where an R side end surface contacts with the latching protrusion 3b.

The optical module 1 is pushed to R direction, which makes the R side end surface of the ejector 5 to contact an opening end surface E of the cage 2. This prevents the ejector 5 from further moving to the R direction. However, the ejector 5 can move to the F/R directions relative to the housing 4, the optical module 1 can further move to the R direction. further movement of the optical module 1 to the R direction causes compression of the energization member 8, and thereby charging energy in it.

The latching protrusion 3b contacts with the latching plate 2b of the cage 2, thereby pushing down the latching plate 2b. When the optical module 1 reaches a locking position L shown in FIGS. 9C and 10C, the latching protrusion 3b drops into the latching hole 2a. The latching plate 2b pops up, thereby latching the latching protrusion 3b. This makes the optical module 1 held at the locking position.

In this state, the latching protrusion 3b and the R side end surface of the ejector 5 are separated with a predetermined distance. Ends of the release arms 6a of the slider 6 is protruded through the protrusion guiding groove 5c of the ejector 5.

Next, motions of the extraction mechanism will be described in the case that the optical module 1 is extracted out of the cage 2.

First, as shown in FIGS. 9D and 10D, the release lever 7 is brought down to an arrowed direction, i.e. a release direction, and opened by a finger. The release lever 7 rotates around the fixation pin 9 to push the contact plate 6b of the slider 6, which contacted with the swinging wall 7c. This makes the slider 6 to move to the R direction.

Because the ejector 5 does not move, further movement of the slider 6 to the R direction causes further compression of the energization member 8. The release arms 6a of the slider 6 further protrude through the protrusion guiding grooves 5c of the ejector 5 to contact with the latching plate 2b of the cage 2. This results in pushing down the latching plate 2b.

As shown in FIGS. 11B and 12B, the release lever 7 is brought down about 90 degrees to be substantially parallel to the F/R directions, thereby further compressing the energization member 8. Also, the release arms 6a further push down the latching plate 2b, to release the engagement between the latching hole 2a and the latching protrusion 3b. This enables the optical module 1 to move to the F directions.

Because the energization member 8 is utmostly compressed, the slider 6 is strongly pushed to the F direction. The buckling prevention pin 8a prevents the energization member 8 from buckling.

A force to push the slider 6 to the F direction is transmitted to the swinging wall 7c, which contacts with the contact plate 6b. This force acts to push the release lever 7 to the F direction, as well as to rotate the release lever 7 around the fixation pin 9. Because an operator pushes down the release lever 7, the release lever 7 is prevented from rotating.

In a locked state, the optical module 1 does not move. When the lock is released, the optical module 1 moves to the F direction, as shown in FIGS. 11C and 12C.

Because the release lever 7 lies to 90 degrees, the force applied by the operator to manipulate the release lever 7 is downward. While the rotation of the release lever 7 is prevented, the movement of the optical module 1 is not interfered. Thus, the release lever 7, the housing 4, and the base 3 conjunctly move to the F direction. The ejector 5, conversely energized to the R direction by the energization member 8, does not move and remains at a position where the R side end surface contacts with the opening end surface E of the cage 2.

The base 3 moves to the F direction, which makes the latching protrusion 3b to contact with the R side end surface of the ejector 5. The force by the energization member to push the ejector 5 to the R direction is transmitted to the latching protrusion 3b, thereby cancelling the force to push the optical module 1 to the F direction. The optical module 1 slows down, and then stops. The collision sound is preferable to occur when the latching protrusion 3b contacts with the R side end surface of the ejector 5, because the extraction of the optical module 1 is also recognized by an auditory sense. Excessive strength of the energization member 8 may cause the optical module 1 to keep a momentum and to completely leap out of the cage 2, In contrast, Insufficient strength of the energization member 8 causes the optical module 1 to stop once the latching protrusion 3b contacts with the ejector 5. Thus, the strength of the energization member 8 is preferable to be designed so that the optical module 1 stops at a position where it moderately comes out of the cage 2. Instead of providing a kickback mechanism to the cage 2, providing the extraction mechanism to the optical module 1 makes it easy to design a coming-out amount of the optical module 1 to be moderate.

Then the operator pulls and extracts the optical module 1 out of the cage 2.

After the optical module 1 stops, the energization member 8 continues to push the slider 6 to the F direction. So, when the operator detaches his finger from the release lever 7, the energization force of the energization member 8 makes the slider 6 to further move to the F direction, as shown in FIGS. 13B and 14B, thereby causing a rotation of the release lever 7 around the fixation pin 9.

Then, as shown in FIGS. 13C and 14C, the release lever 7 stops to contact with the housing 4. Thus, the release lever 7 automatically returns to the original position.

As described above, the optical module 1 is extracted from the cage 2. The extraction mechanism A makes the optical module 1 popped out of the cage 2. This causes clear discrimination of unlocking at the time of extraction. The extraction mechanism A is provided to the optical module 1. This causes clear discrimination of unlocking at the time of extraction, even when the optical module 1 is connected to a cage with no kickback mechanism or a cage with a kickback mechanism having insufficient force to push out. All you need to pop the optical module 1 out of the cage 2 is to rotate the release lever 7 with your finger. An extraction manipulation can be done with one action, which enhances operation efficiency. The release lever 7 is conjunct with the housing 4, thereby contributing a predetermined adaptor shape on the whole. A manipulation part of the extraction mechanism is not required other than the adaptor part of the connector 1a. This enables the optical module 1 to be smaller. The plug provided at the end of the optical fiber is connected through the opening 7a of the release lever 7. The release lever 7 cannot be pushed down when the plug is connected. This prevents misoperation to release the connection between the optical module 1 and the cage 2.

Application of the extraction mechanism A according to the present disclosure is not limited to an optical communication equipment. It can be broadly applied to electric communication equipment, etc.

The above described embodiment is an example to make understanding easier. The present invention is not limited to the example, and includes any modified, altered, added, or removed variations, without departing from the scope of the claims attached herewith. This can be easily understood by persons skilled in the art.

DESCRIPTION OF SIGNS

1: optical module; 1a: connector; 2: cage; 2a: latching hole; 2b: latching plate; 3 base; 3a: main cover; 3b: latching protrusion; 4: housing; 4a, 4b and 7b: shaft hole; 4c and 5b: guiding groove; 5: ejector; 5a and 6c: spring seat; 5c: protrusion guiding groove; 5d and 6d: guiding plate; 6: slider; 6a: release arm; 6b: contact plate; 7: release lever; 7a: opening; 7c swinging wall; 8 energization member; 8a: buckling prevention pin; 9: fixation pin; A: extraction mechanism; E: opening end surface; and L: locking position.

What is claimed is:

1. An extraction mechanism, comprising:
   a slider configured to release an engagement between a cage and a device inserted into the cage and engaged and latched to the cage, the slider being slidable in an insertion direction and an extraction direction of the device;
   an ejection part including an ejector that is slidable in the insertion direction and the extraction direction of the device, the ejection part being configured to eject the device out of the cage;
   a release lever configured to activate the slider and the ejection part; and
   a coil spring located between the slider and the ejector, the coil spring extending parallel to a longitudinal direction of the device and configured to energize the slider to the extraction direction and to energize the ejector to the insertion direction, wherein
   the ejector is configured to contact with the cage and to catch an energization force of the coil spring when the device is latched to the cage,
   by the release lever being moved to a release direction, the slider is configured to slide to the insertion direction, thereby compressing the coil spring to charge energy in the coil spring, and releasing the engagement between the cage and the device,
   by release of the engagement between the cage and the device, the energy charged in the coil spring is released to push the slider to the extraction direction, thereby ejecting the device out of the cage, and
   the extraction mechanism is provided to the device.

2. The extraction mechanism according to claim 1, wherein the release lever is configured to be moved to the release direction to activate the slider and the ejection part, the release direction being different from the insertion direction and the extraction direction of the device.

3. The extraction mechanism according to claim 1, wherein by the coil spring pushing the release lever via the slider to a direction opposite to the release direction, the release lever is configured to return to an original position.

4. The extraction mechanism according to claim 1 wherein a collision sound is configured to occur by the ejector hitting a part of the device, when the device is ejected out of the cage.

5. The extraction mechanism according to claim 1, wherein the release lever is swingable around a swinging axis substantially perpendicular to the insertion direction and the extraction direction of the device, and
   the slider and the ejection part are configured to be activated when the release lever reaches a position in the extraction direction looking from the swinging axis.

6. The extraction mechanism according to claim 1, wherein the device comprises a connector configured to be connected with a connector plug, and
   the release lever comprises an opening configured to have an end of the connector plug inserted there through.

7. A device, comprising the extraction mechanism according to claim 1.

8. The device according to claim 7, wherein the device is an optical module.

* * * * *